R. WASMANSDORFF.
MEASURING FAUCET.
No. 185,001. Patented Dec. 5, 1876.
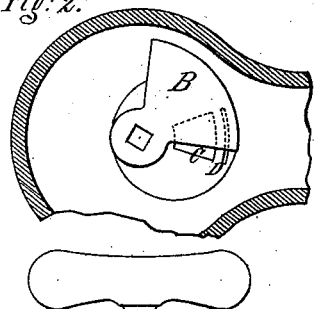
Fig. 2.
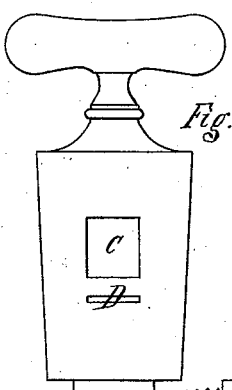
Fig. 5.
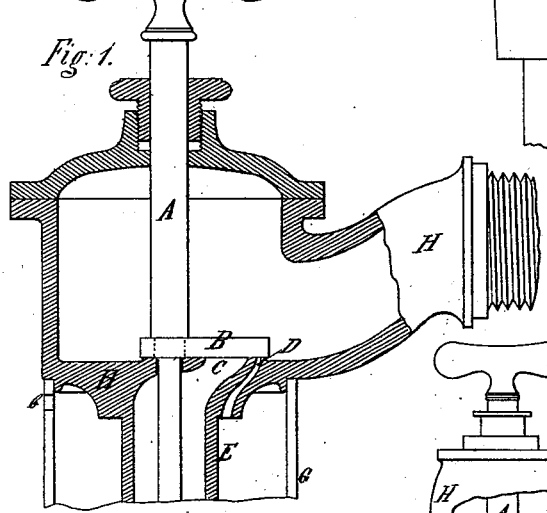
Fig. 1.
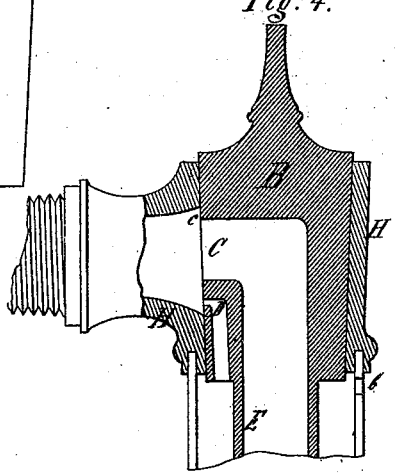
Fig. 4.
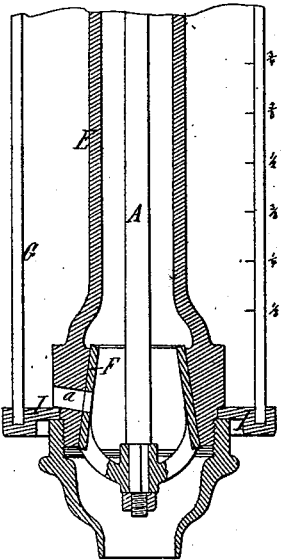
Fig. 3.
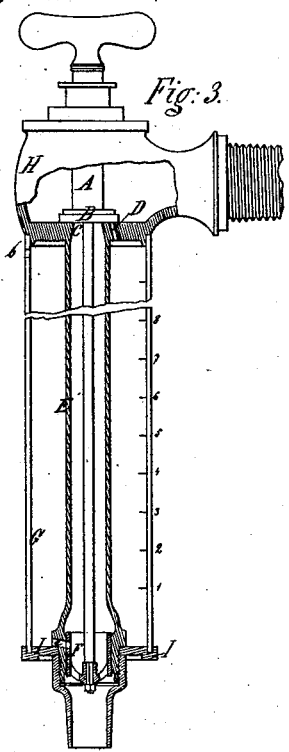
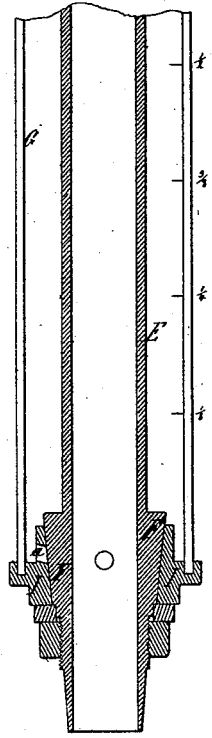
Richard Wasmansdorff

UNITED STATES PATENT OFFICE.

RICHARD WASMANSDORFF, OF GENTHIN, PRUSSIA.

IMPROVEMENT IN MEASURING-FAUCETS.

Specification forming part of Letters Patent No. 185,001, dated December 5, 1876; application filed October 30, 1876.

*To all whom it may concern:*

Be it known that I, RICHARD WASMANSDORFF, of the city of Genthin, Prussia, have invented certain Improvements in Measuring-Faucets, of which the following is a specification:

My invention relates to a new device for measuring liquids, and offers the advantage that the liquid, when drawn from the barrel or any other reservoir, is measured in the faucet while running through; and, in order to measure large quantities by a comparatively small apparatus, I use only a certain part of the liquid — one-tenth, one-fiftieth, one-hundredth, &c.—to show the volume or the weight of the quantity drawn from the barrel.

Figure 1 of the drawing represents the section of one of my measuring-faucets in natural size. It will be opened and shut by means of the spindle A, which, in turning, moves a plate, B, and uncovers the openings C and D, allowing the liquid to run freely. E is a pipe, in the lower extremity of which turns a hollow cone, F, with the spindle A. The pipe E is provided with a hole, *a*, at the lower part of the measuring-cylinder, corresponding with a perforation of the cone F. G is a glass cylinder tightly fixed between the upper body H of the faucet and the disk I, in the groove of which the said glass cylinder is fairly cemented to avoid any leaking.

The openings C and D are parts of concentrical rings, as Fig. 2 represents; and they are chosen in such a way that the surface of the broader ring is nine times larger than that of the narrow ring; consequently the opening C will be nine times as large as D, and the proportion of the openings will always be the same, no matter whether the plate B is only turned partly aside, or whether it leaves the holes C and D quite open. So it will clearly be understood that the liquid running through D always amounts to exactly one-ninth of the quantity discharged through C, and will consequently indicate the right measure as well when the faucet is only partly opened as when it is quite open, provided that the holes C and D are the smallest sections of the respective passages. The liquid passing through C goes right into the pipe E and directly into a vessel placed under the faucet, while the liquid discharged through D passes into the glass cylinder, and as by the turning of the spindle A the cone F shuts the outlet of the said glass cylinder, the liquid will gather in it and slowly rise, showing at the scale, when the faucet ought to be shut to give the desired quantity. *b* is a hole in the top of the glass cylinder to allow the air to escape freely.

Fig. 3 represents another device, one-half of natural size, where the openings C and D are thought to have the proportion one to ninety-nine, and where the spindle A is provided with thread in the stuffing-box, so as to open the valve by lifting the plate B. At the same time the hollow cylinder F will turn and be drawn upward, so as to shut the hole *a*, and only allowing the show-liquid (here one one-hundredth of the quantity to be measured) to run off and complete the measure, when the faucet will be shut again. The different letters in Fig. 3 indicate, respectively, the same parts as in the other figures.

Figs. 4 and 5 show a disposition, where the pipe E forms one piece with the upper cone B and the lower cone F of the spindle. The holes in the cone B are made rectangular of the same length; and the width has the proportions one to nine, one to twenty-four, one to forty-nine, one to ninety-nine, &c. Care should be taken that the sides at *c* of the channel *d* in the body H of the faucet are made straight and parallel to the sides of the holes C and D, that a partial turning of the spindle may give a right measure. The scales can be ground in the glass, or can be made of paper to be pasted thereon, and showing volumes or weights of liquids marked on the paper according to the different specific gravities.

The advantages of my invention will be obvious: all the spilling, that cannot be avoided in the use of ordinary measures, will be dispensed with; the filling into bottles or cans with a small mouth will be very easy without employing a funnel; and the apparatus, affording the possibility of drawing any desired quantity of liquid in a very short time, (by suitable proportions of the holes C and D up to hundred gallons and more,) will require very little space.

I claim as my invention—

A measuring-faucet wherein the liquid is divided into a running liquid and a "show" liquid, the latter forming one certain part—one-tenth, one-fiftieth, one one-hundredth, one one-thousandth, &c., of the liquid to be measured, substantially as hereinbefore set forth, and shown by the drawing.

In testimony whereof I have signed my name in this specification in the presence of two subscribing witnesses.

RICHARD WASMANSDORFF.

Witnesses:
 E. DONATH,
 C. PEIN.